US 7,747,095 B2

(12) United States Patent
Tjandrasuwita et al.

(10) Patent No.: US 7,747,095 B2
(45) Date of Patent: Jun. 29, 2010

(54) METHODS AND SYSTEMS FOR RATE CONTROL IN IMAGE COMPRESSION

(75) Inventors: Ignatius B. Tjandrasuwita, Atherton, CA (US); Lefan Zhong, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 732 days.

(21) Appl. No.: 10/962,311

(22) Filed: Oct. 8, 2004

(65) Prior Publication Data

US 2006/0078211 A1    Apr. 13, 2006

(51) Int. Cl.
G06K 9/36   (2006.01)
G06K 9/46   (2006.01)

(52) U.S. Cl. .................. 382/239; 382/245; 382/248

(58) Field of Classification Search .......... 382/239, 382/245, 246, 248; 375/240.02, 240.18, 375/240.23
See application file for complete search history.

(56) References Cited

U.S. PATENT DOCUMENTS

| 5,084,791 | A  | 1/1992  | Thanos et al.   |
|-----------|----|---------|-----------------|
| 5,576,765 | A  | 11/1996 | Cheney et al.   |
| 5,598,222 | A  | 1/1997  | Lane            |
| 5,761,466 | A  | 6/1998  | Chau            |
| 5,990,812 | A  | 11/1999 | Bakhmutsky      |
| 6,118,903 | A  | 9/2000  | Liu             |
| 6,212,645 | B1 | 4/2001  | Tjandrasuwita   |
| 6,259,479 | B1 | 7/2001  | Gadre et al.    |
| 6,507,293 | B2 | 1/2003  | Deeley et al.   |
| 6,653,955 | B1 | 11/2003 | Yang            |
| 6,654,417 | B1 | 11/2003 | Hui             |
| 6,760,035 | B2 | 7/2004  | Tjandrasuwita   |
| 6,937,653 | B2 * | 8/2005 | Song et al. ............. 375/240.03 |
| 6,961,376 | B2 | 11/2005 | Wu et al.       |
| 7,020,198 | B2 | 3/2006  | Wang et al.     |
| 7,095,784 | B2 | 8/2006  | Chang et al.    |
| 7,194,031 | B2 | 3/2007  | Chang           |
| 7,209,643 | B2 | 4/2007  | Sato et al.     |
| 7,224,837 | B2 | 5/2007  | Olshansky et al.|
| 7,254,176 | B2 | 8/2007  | Chang et al.    |
| 2001/0038669 | A1 | 11/2001 | Hall et al.  |

(Continued)

FOREIGN PATENT DOCUMENTS

EP    0722362    5/1997

(Continued)

OTHER PUBLICATIONS

Wook Joong Kim; et al: "A Bit Allocation Method Based on Picture Activity for Still Image Coding" IEEE Transactions on Image Processing, IEEE Service Center, Piscataway, NJ, US, vol. 8, No. 7, Jul. 1, 1999, XP011026341 ISSN: 1057-7149 *p. 974, right-hand column, lines 3-6*.

(Continued)

Primary Examiner—Phuoc Tran (57) ABSTRACT

Methods and systems for compressing an image are described. A plurality of transformed and quantized values associated with a block of image data is accessed. The block corresponds to a position within the image. A count of the number of bits encoded during run-length encoding of the block is made. Run-length encoding of the block is concluded should the count reach a limit.

25 Claims, 8 Drawing Sheets

U.S. PATENT DOCUMENTS

| | | |
|---|---|---|
| 2004/0143728 A1 | 7/2004 | Flynn et al. |
| 2005/0123057 A1 | 6/2005 | MacInnis et al. |
| 2006/0143669 A1 | 6/2006 | Cohen |

FOREIGN PATENT DOCUMENTS

| | | |
|---|---|---|
| EP | 0914006 | 5/1999 |
| JP | 10-243399 | 9/1998 |
| JP | 10336649 | 12/1998 |
| JP | 2000-333172 | 11/2000 |
| TW | 00485323 | 5/2002 |
| WO | 9319434 | 9/1993 |
| WO | 9626612 | 8/1996 |
| WO | 9911072 | 3/1999 |

OTHER PUBLICATIONS

European Search Report; PCT/US20050358948; Publication Date Apr. 27, 2009; Application No. 05802836.6.-1522/1797520; Applicant: NVIDIA Corporation.

* cited by examiner

METHODS AND SYSTEMS FOR RATE CONTROL IN IMAGE COMPRESSION

FIELD OF THE INVENTION

Embodiments of the present invention generally relate to image compression.

BACKGROUND ART

Image data can be compressed (encoded) to reduce the amount of data associated with an image without significantly affecting the fidelity of the image. Image compression standards, such as the JPEG (Joint Photographic Experts Group) compression standard, work well to reduce the amount of image data.

In JPEG encoding, the input image is decomposed into MCUs (macro code units or minimum coded units), also referred to as macroblocks. Each MCU includes a number of blocks, typically an array of 8×8 values. A block can be associated with each of the separate image or color components of the image. For example, an MCU may include a luminance block (e.g., a Y-block) and two chrominance blocks (e.g., a U-block and a V-block).

A discrete cosine transform (DCT) is performed to convert each block into frequency space (referred to as DCT coefficients). Typically, most images contain little high frequency information, and so most of the transformed image data is concentrated in the low frequency components. For each 8×8 block, 64 DCT coefficients are produced (one "DC" coefficient and 63 "AC" coefficients). The DCT transformation itself does not reduce the amount of data.

In quantization, some of the frequency information is in essence discarded, so that fewer bits can be used to describe the image. Consider, for example, that there may be 256 possible levels of coloration (e.g., from lightest to darkest) for a pixel. Therefore, prior to quantization, each level would be identified by a unique combination of eight (8) bits. However, using quantization, the 256 possible levels can be quantized into 16 steps of 16 levels each, each step identified by a unique combination of only four (4) bits.

The lower frequency DCT coefficients can be quantized more discretely using a relatively large number of bits, while the higher frequency DCT coefficients can be quantized on a cruder basis using a relatively small number of bits. Thus, lower frequency coefficients might be quantized into 16 steps, each represented using 4 bits as described above, while higher frequency coefficients might be quantized into two steps, each represented by one (1) bit.

The quantization steps applied to the DCT coefficients are arranged in an 8×8 array referred to as a quantization table, such that an entry in the quantization table corresponds to a location in the array of DCT coefficients. The quantization table drives the amount of compression (the "compression ratio") because it specifies the size of the quantization steps. The larger the quantization steps, the greater the compression ratio, but there will be a commensurate reduction in the quality of the reconstructed (decompressed or decoded) image. Conversely, smaller quantization steps mean that the uncompressed data is more closely represented, thereby increasing the quality of the reconstructed image but reducing the compression ratio.

After quantization, the compression process concludes with run-length encoding (e.g., Huffman encoding) to encode and serialize the quantized data into a bitstream. The size of the bitstream (measured in bits or bytes) varies as a function of the amount of quantization and is also a function of the image data.

A desirable feature of a compression scheme is control of the compression ratio (referred to as "rate control"). Rate control means that a target compression ratio is specified; when the image data are compressed according to the target compression ratio, the length of the resultant bitstream is equal to or less than the target size. With proper rate control, it is possible to efficiently allocate file space for the compressed data or allocate bandwidth to transfer the compressed data, because the required amount of compressed data is roughly known. Otherwise, if too little file space is allocated, then the compressed data will not fit into the allocated file space or may exceed the available transfer bandwidth.

As mentioned above, the compression ratio and the output quality (e.g., the quality of the reconstructed image) are controlled by varying the quantization values. In JPEG encoding, quantization values are selected prior to encoding, and one set of values is applied to the entire image. Unfortunately, for an input amount of data (uncompressed) and a selected set of quantization values, it is not possible to accurately predict the amount of output data (compressed). In fact, the size of the output bitstream can vary significantly from image to image, and in worst cases may even be larger than the input bitstream. This uncertainty in the size of the output bitstream is problematic because, as mentioned above, the amount of compressed data may be too large to properly fit into the allocated file space or may be too large to transfer given an allocated transfer bandwidth.

If the amount of compressed data is too large, then a new set of quantization values may be selected and the data compressed again. The process is repeated until the target compression ratio (e.g., the target bitstream or file size) is achieved. Thus, conventional techniques can require multiple iterations, increasing both encoding time and the use of computing resources (power, memory, processor cycles, etc.). The risk of exceeding the target bitstream or file size can be reduced by choosing larger quantization values, but this comes at the expense of reducing too heavily the quality of the reconstructed image.

SUMMARY OF THE INVENTION

Accordingly, a system and/or method that can efficiently compress image data to a target compression ratio would be advantageous. Embodiments in accordance with the present invention provide this and other advantages.

In one embodiment of the present invention, a limit or budget is assigned to each block (e.g., each luminance and chrominance block) of transformed and quantized image data. In one such embodiment, the size of the budget is a function of the position within the image with which the block is associated. The budget can be the same or different for each block. In one embodiment, the sum of all the budgets is not more than the size of the target bitstream or file.

In one embodiment, during run-length encoding of the transformed and quantized image data in a block, the number of bits being encoded (e.g., serialized into the bitstream) is counted. When the count reaches the limit specified for the block, encoding of that block is concluded. That is, any transformed and quantized values that have not yet been run-length encoded are essentially discarded by forcing an end-of-block code if the budget is exhausted before a block is encoded in entirety.

In another embodiment, if a block is encoded without consuming its entire budget, any remaining portion of that budget can be added to the budget of another block.

In yet another embodiment, a first threshold is defined within each budget. The first threshold essentially establishes a margin to the limit enforced by the budget. In such an embodiment, if the first threshold is reached, then any remaining (e.g., not yet encoded) transformed and quantized values that do not satisfy a second threshold are set to zero (in effect, they are discarded). The second threshold is associated with the size of the transformed and quantized values. The first and second threshold values are programmable and may be changed during the course of the encoding.

In summary, according to embodiments of the present invention, rate control is efficiently achieved by establishing a budget that is distributed amongst the blocks of image data and enforced on a block-by-block basis. In one embodiment, the transformed and quantized values in a block that are run-length encoded later, and that generally correspond to the values that contribute less to image fidelity, are discarded (not encoded), reducing the amount of compressed data without significantly reducing image fidelity. In another embodiment, the "smaller" transformed and quantized values (e.g., those values that do not satisfy the second threshold mentioned above), which generally do not contribute significantly to image fidelity, are discarded (not encoded), also reducing the amount of compressed data without significantly reducing image fidelity.

The objects and advantages mentioned above, as well as other objects and advantages of the various embodiments of the present invention, will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

The drawings referred to in the description should not be understood as being drawn to scale except if specifically noted.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "maintaining," "counting," "compressing," "decompressing," "encoding," "decoding," "increasing," "concluding," "changing," "transforming," "quantizing," "receiving," "assigning," "selecting," "reducing" or the like, refer to actions and processes (e.g., flowcharts 700 and 800 of FIGS. 7 and 8, respectively) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

Figure 1A:
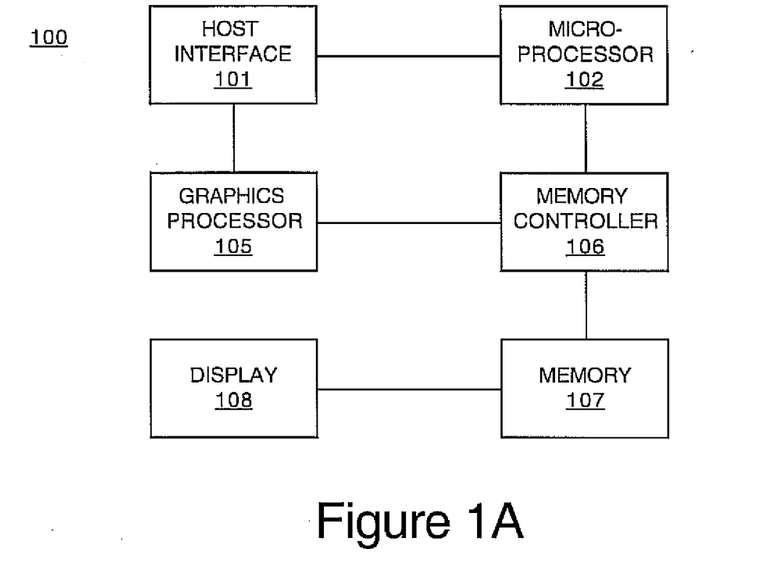
FIG. 1A is a block diagram of one example of a system upon which embodiments in accordance with the present invention may be implemented.

FIG. 1A is a block diagram of a system 100 upon which embodiments in accordance with the present invention may be implemented. System 100 shows the components of an execution platform for implementing certain functionality of embodiments in accordance with the present invention. As depicted in FIG. 1A, the system 100 includes a microprocessor 102 coupled to a graphics processor 105 via a host interface 101. The host interface 101 translates data and commands passing between the microprocessor 102 and the graphics processor 105 into their respective formats. Both the microprocessor 102 and the graphics processor 105 are coupled to a memory 107 via a memory controller 106. In the system 100 embodiment, the memory 107 is a shared memory, whereby the memory 107 stores instructions and data for both the microprocessor 102 and the graphics processor 105. Access to the shared memory 107 is through the memory controller 106. The shared memory 106 also includes a video frame buffer for storing pixel data that drives a coupled display 108.

As described above, certain processes and steps of the present invention are realized, in one embodiment, as a series of instructions (e.g., a software program) that reside within computer-readable memory (e.g., memory 107) of a computer system (e.g., system 100) and are executed by the microprocessor 102 and graphics processor 105 of system 100. When executed, the instructions cause the system 100 to implement the functionality of embodiments of the present invention as described below. In another embodiment, certain processes and steps of the present invention are realized in hardware (e.g., using graphics processor 105).

Additionally, although the components of FIG. 1A are depicted as discrete components, several of the components can be implemented as a single integrated circuit device (e.g., a single integrated circuit die) configured to take advantage of the high levels of integration provided by modern semiconductor fabrication processes. For example, in one embodiment, the microprocessor 102, host interface 101, graphics processor 105, and memory controller 106 are fabricated as a single integrated circuit die.

Figure 1B:
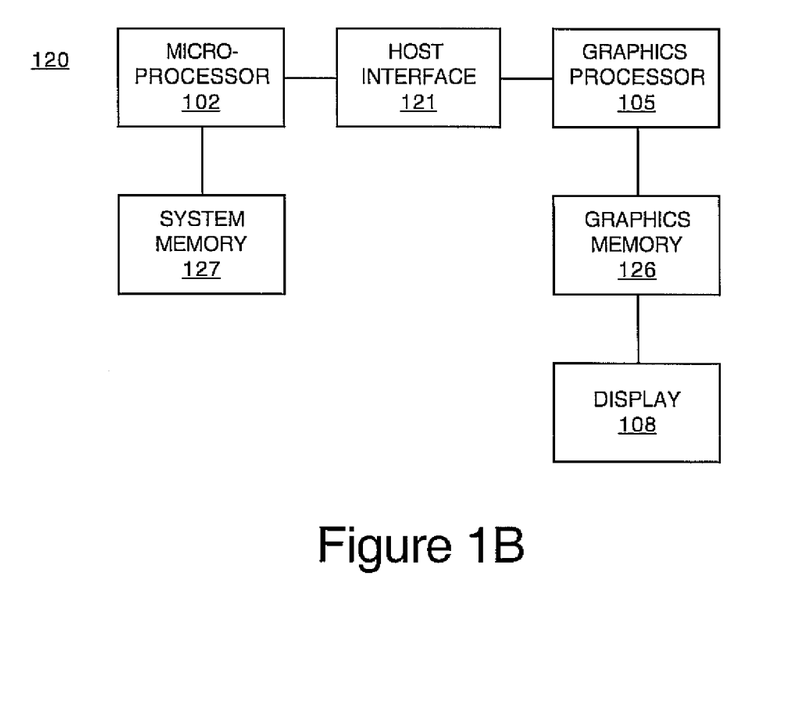
FIG. 1B is a block diagram of another example of a system upon which embodiments in accordance with the present invention may be implemented.

FIG. 1B shows a system 120 in accordance with an alternative embodiment of the present invention. System 120 is substantially similar to system 100 of FIG. 1A. System 120, however, utilizes a microprocessor 102 having a dedicated system memory 127, and a graphics processor 105 having a dedicated graphics memory 126. In system 120, in one embodiment, the system memory 127 stores instructions and data for processes/threads executing on the microprocessor 102, and graphics memory 126 stores instructions and data for those processes/threads executing on the graphics processor 105. The graphics memory 126 stores pixel data in a frame buffer that drives the display 108. As with system 100 of FIG. 1A, one or more of the components of system 120 may be integrated as a single integrated circuit die.

Figure 2:
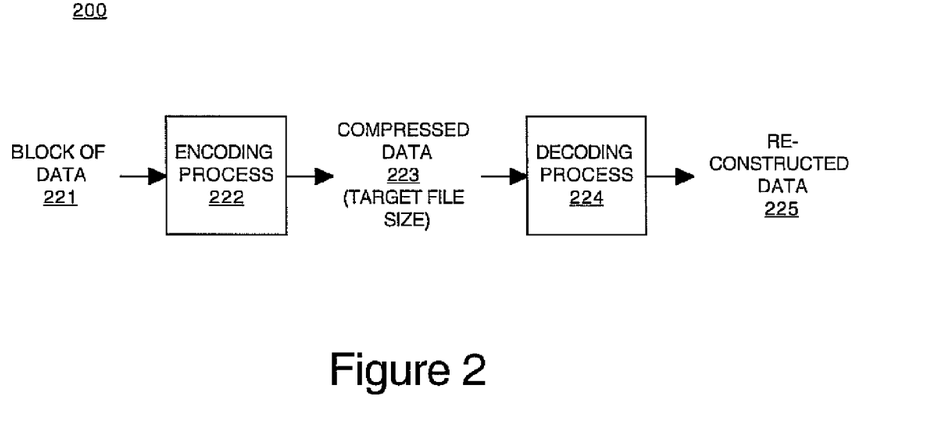
FIG. 2 is a data flow diagram showing the flow of data in an encoding and decoding process according to one embodiment of the present invention.

FIG. 2 is a data flow diagram 200 showing the flow of data in a data encoding process 222 and a data decoding process 224 according to one embodiment of the present invention. Encoding process 222 compresses (encodes) the data 221 using an encoding scheme that is described more fully below. Decoding process 224 of FIG. 2 decompresses (reconstructs) the compressed data 223 to generate the reconstructed data 225. Importantly, according to embodiments of the present invention, the amount of compressed data 223 will fit into a target file or will not exceed available transfer bandwidth, as described more fully below. The compressed data 223 can subsequently be retrieved and streamed to a decoder. Alternatively, the compressed data 223 can be streamed to a decoder as it is encoded, either in lieu of storage or in parallel with storage.

Figure 3:
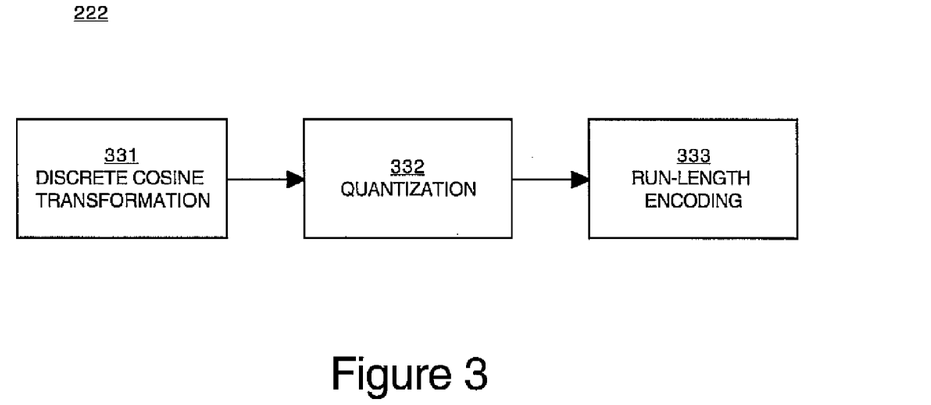
FIG. 3 is a data flow diagram showing steps in an encoding process according to one embodiment of the present invention.

FIG. 3 is a data flow diagram showing steps in an encoding process 222 according to one embodiment of the present invention. In one embodiment, encoding process 222 is implemented using a compression scheme that is substantially compliant with JPEG; however, the present invention is not so limited.

Encoding process 222 includes discrete cosine transformation (DCT) 331, quantization 332, and run-length encoding 333. In DCT 331, each block of data 221 (FIG. 2) is converted into DCT coefficients. For each 8×8 block of data, 64 DCT coefficients are produced (one DC coefficient and 63 AC coefficients).

In quantization 332 (FIG. 3), some of the frequency information is in essence discarded, so that fewer bits can be used to describe the image. The lower frequency DCT coefficients can be quantized more discretely using a relatively large number of bits, while the higher frequency DCT coefficients can be quantized on a cruder basis using a relatively small number of bits.

After quantization 332, run-length encoding 333 (e.g., Huffman encoding) is performed to encode and serialize the quantized data. During run-length encoding, an often-repeated string may be replaced with a code, with the most commonly occurring strings getting the shorter codes. The encoded data can be stored in a file, from which it can be subsequently read and streamed to a decoder. Alternatively, encoded data can be streamed to a decoder as the data is encoded.

Significantly, in accordance with embodiments of the present invention, rate control (e.g., a target file or bitstream size) can be more reliably achieved, and as a result the number of iterations back and forth between quantization 332 and run-length encoding 333 is expected to be reduced.

Figure 4:
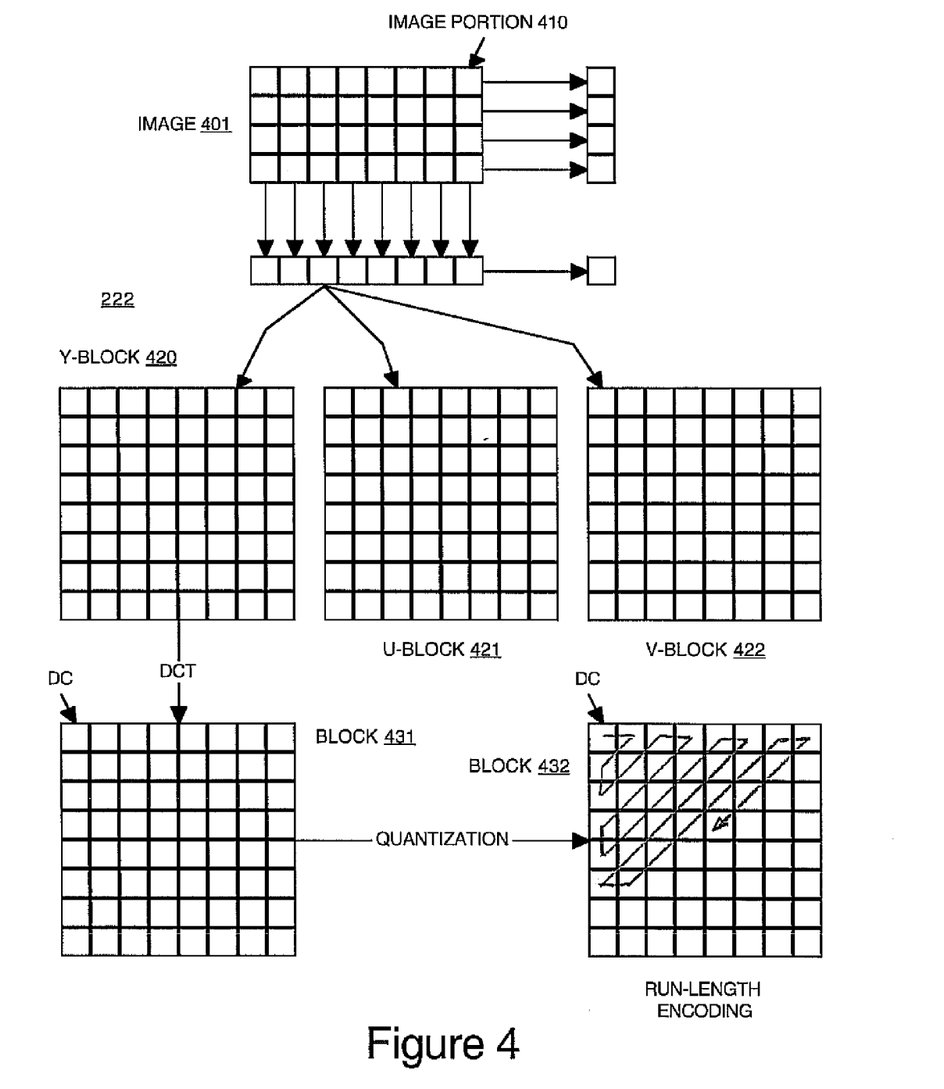
FIG. 4 is a data flow diagram showing steps in an encoding process according to one embodiment of the present invention.

FIG. 4 is a data flow diagram showing steps in an encoding process (e.g., encoding process 222 of FIGS. 2 and 3) according to one embodiment of the present invention. In the example of FIG. 4, an image 401 includes a number of image portions, represented by image portion 410. In one embodiment, image portion 410 is represented by a macroblock or MCU that includes a number of blocks of data. In the example of FIG. 4, associated with image portion 410 are a Y-block 420 (e.g., a luminance block), and a U-block 421 and V-block 422 (e.g., chrominance blocks). However, the present invention is not limited to the use of a YUV format. Instead, for example, an RGB (red, green, blue) format or a CMYK (cyan, magenta, yellow, black) format may be used.

In the present embodiment, each of the blocks 420, 421 and 422 is arranged as an 8×8 array of data. Using Y-block 422 as an example, the data in each block is transformed into an 8×8 array (block 431) of DCT coefficients. In transformed block 431, the first value (e.g., the value in the upper left corner of block 431) is referred to as the DC value (this value establishes the average brightness). The remaining values in block 431 are referred to as the AC values. The AC values describe the variation from the DC value. In general, the values in block 431 are referred to as DCT coefficients.

In the present embodiment, the DCT coefficients in block 431 are quantized. Block 432 represents the quantized DCT coefficients. The transformed and quantized data in block 432 can then be encoded and serialized into a bitstream using, for example, run-length encoding. The resultant data can then be written to a file or streamed to a decoder.

In one embodiment, the transformed and quantized data in block 432 is read or scanned in a zigzag fashion, as illustrated in FIG. 4. However, the present invention is not so limited. For example, the data in block 432 can instead be read row-by-row or column-by-column.

In accordance with the embodiments of the present invention, a budget or limit is assigned to each block. The budget limits the number of bits that can be encoded from block 432.

The budget or limit is enforced during run-length encoding of the transformed and quantized data in block 432. In one embodiment, as the values in block 432 are read and encoded, the number of bits associated with each value is counted. When the count reaches the budget limit, encoding of block 432 is concluded. In one embodiment, an end-of-block code is inserted into the bitstream to indicate the end of the encoded data from block 432, and any remaining (unencoded) values in block 432 are discarded.

The budget may be the same for all blocks associated with a particular image component, or it may vary from block to block. Thus, for example, all Y-blocks may have the same budget, or they may have different budgets. Also, each block associated with a particular MCU or image portion can have the same budget or different budgets. That is, for example, Y-block 420, U-block 421 and V-block 422, although all associated with the same image portion 410, can have different budgets, or they may have the same budget.

It may be desirable for blocks associated with some portions of the image 401 to be assigned budgets larger than the budgets assigned to blocks associated with other portions of the image. That is, there may be one or more regions of the image 401 that are considered more important than other regions of the image, and it may be desirable to assign larger budgets to the blocks associated with the relatively more important regions. For example, in a portrait, it may be desirable for the reconstructed image to more accurately portray the subject of the portrait (typically situated toward the center of the image), with less attention paid to the portions of the image surrounding the subject (e.g., the borders of the image, in particular). As discussed in more detail in conjunction with FIG. 6A below, a user can define the center or some other focal point of the image (not necessarily the center), and blocks are assigned budgets according to their distance from that point.

The total budget available for encoding the entire image 401 of FIG. 4 is not more than the size of the target file or bitstream. In other words, the sum total of the individual budgets (in bits) assigned to the blocks is not more than target file or bitstream size. Thus, because each block is encoded within its respective budget, when image 401 is compressed, the encoded image data will fit into the amount of storage space allocated for it.

Embodiments in accordance with the present invention can be implemented using at least a couple of different approaches. In one approach, the block-by-block budgets are enforced separately for each block. That is, a block is assigned a budget, and during run-length encoding of that block, the number of bits being encoded are counted just for that block. Run-length encoding of a block continues until either all of the data for that block is encoded or until the budget limit is reached.

In another approach, a cumulative count is maintained from one block to the next, and the budget is increased accordingly. As the data in a first block is run-length encoded, the number of bits being encoded is counted. Run-length encoding of the first block will continue until either all of the data are serialized or until the budget limit is reached. Upon conclusion of the run-length encoding of the first block, the budget is increased by the amount of budget assigned to a second block to be encoded. As the data in the second block is run-length encoded, the number of bits being encoded is counted, with the count for the second block continuing where the count for the first block left off.

In either of the above approaches, there can be cases in which the budget for a block is not totally consumed. That is, there will be situations in which all of the transformed and quantized values in a block are run-length encoded before the budget limit is reached.

In the latter of the approaches discussed above, any portion of the budget for the first block that was not used will be automatically carried over to the budget applied during run-length encoding of the second block.

In the former of the approaches discussed above, any remaining portion of the budget for one block can be used to increase the budget of another block. For instance, once run-length encoding of one block is concluded, any unused portion of the budget for that block can be added to the budget of the next block to be encoded. Alternatively, the unused portion of the budget for one block can instead be held in reserve and applied to any of the other blocks, not necessarily the next block to be encoded. For instance, as mentioned above, one portion of an image may be considered more important than another, and it may be desirable for that portion to have a larger budget than other portions of the image. Accordingly, the unused portion of a budget from one block can be added to the budget of a block associated with a relatively more important portion of the image. In a similar vein, the unused budget portions can instead be accumulated in a reserve, and blocks that are considered to be of higher importance can draw on the reserve as needed.

Note that the unused budget from a block associated with one type of image component can be applied to the budget of a block associated with another type of image component. That is, for example, any budget remaining after the encoding of a Y-block can be added to the budget of another Y-block or to the budget of a U-block or V-block.

Figure 5:
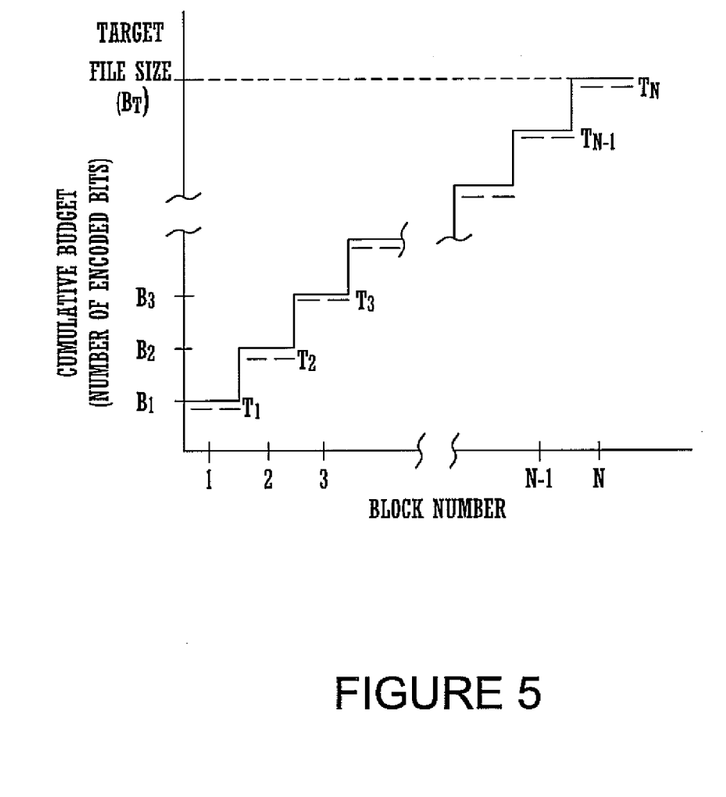
FIG. 5 is a graph of an example of a budget that can be used to achieve rate control according to one embodiment of the present invention.

FIG. 5 is a graph of an example of a budget that can be used to achieve rate control according to one embodiment of the present invention. The example of FIG. 5 corresponds to the approach presented above in which a cumulative count is maintained from one block to the next, and the budget is increased accordingly. Thus, the budget shown in FIG. 5 (expressed in terms of the number of encoded bits) is a cumulative value that accumulates from one block to the next. In actuality, the budget amount assigned to block 1 is $B_1$, the budget amount assigned to block 2 is $B_2$ minus $B_1$, the budget amount assigned to block 3 is $B_3$ minus $B_2$, and so on.

FIG. 5 appears to illustrate that each block is assigned the same amount of budget. However, as mentioned above, the present invention is not so limited, and blocks can be assigned different budgets.

In one embodiment, a threshold is established within the budget of each block. In the example of FIG. 5, the budget for block 1 includes a threshold $T_1$ that, when measured in bits, is less than the budget limit $B_1$. The threshold in essence defines a margin to the budget limit. The threshold is a programmable value that may be changed during the course of encoding.

In one embodiment, during run-length encoding of a block, should the number of bits encoded reach the threshold in the budget (the "first threshold"), then during the remainder of the encoding of that block, those transformed and quantized values that are "smaller" than a second threshold value are not encoded. In one such embodiment, the second threshold corresponds to the respective magnitudes of the transformed and quantized values. Thus, for example, a transformed and quantized value that has a magnitude less than that specified by the second threshold will not be encoded (e.g., its value is set to zero) if the number of bits encoded exceeds the first threshold. Alternatively, the second threshold value can correspond to the number of bits needed to encode the transformed and quantized values. In that case, for example, a transformed and quantized value that has a length in bits that does not satisfy the second threshold will not be encoded if the number of bits encoded exceeds the first threshold.

The second threshold value, applied to the size of the values in the block being encoded, is a programmable value. The value of the second threshold may be changed during the course of run-length encoding a block. For example, once the first (budget) threshold is reached, the value of the second threshold can be increased as the number of encoded bits approaches the budget limit, so that progressively larger transformed and quantized values within the block are not encoded, leaving budget for the largest of the values remaining to be encoded. Alternatively, after the first threshold is reached, the value of the second threshold can be decreased if the budget is not being consumed as quickly as anticipated. The second threshold value can also be changed as encoding progresses from one block to the next. Thus, the second threshold value can be different from one block to another.

Figure 6A:
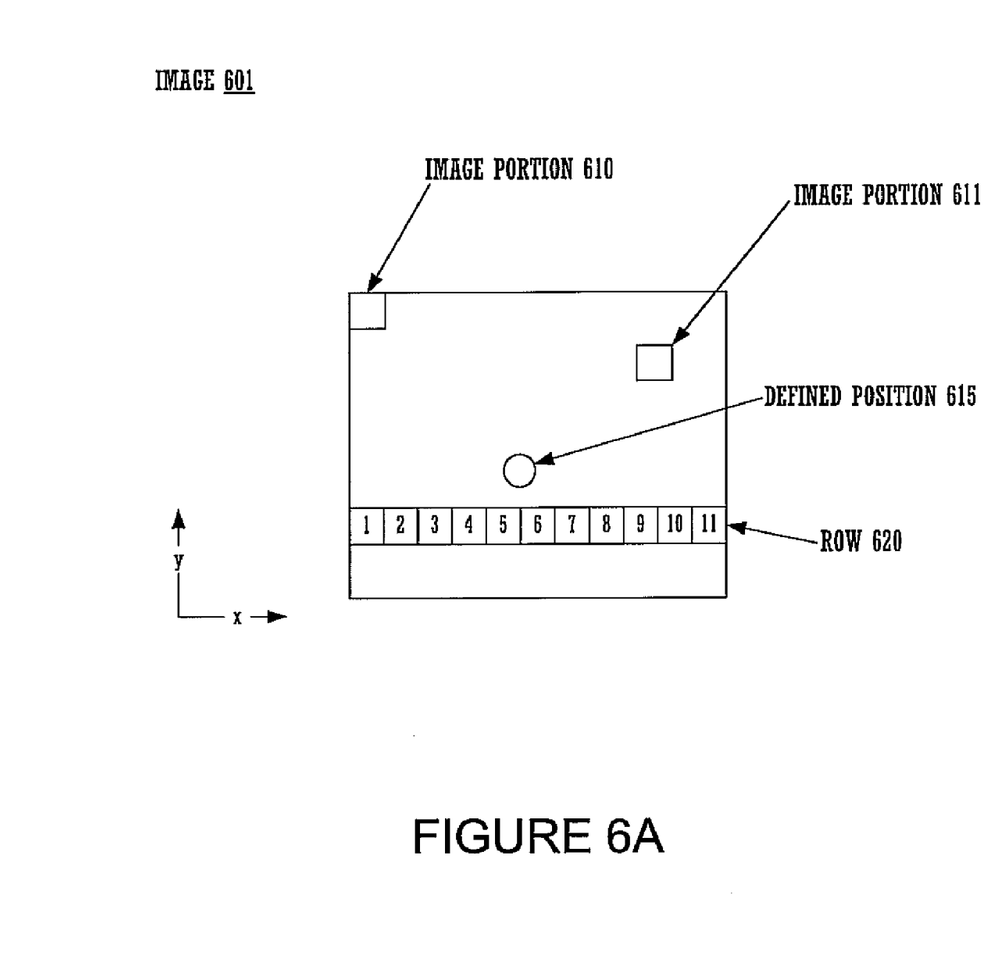
FIG. 6A illustrates an image that can be compressed according to one embodiment of the present invention.

FIG. 6A illustrates an image 601 that can be compressed according to one embodiment of the present invention. As mentioned above, it may be desirable for blocks associated with some portions of the image 601 to be assigned budgets larger than the budgets assigned to blocks associated with other portions of the image 601. That is, there may be one or more regions of the image that are considered more important than other regions of the image, and it may be desirable to assign larger budgets to the blocks associated with the relatively more important regions.

In one embodiment, a position 615 is specified within the image 601, perhaps by a user. The position 615 corresponds to the region of image 601 that is considered to be of highest importance. The position 615 can be any located anywhere within the image 601. A default position can be also specified, such as the center of the image 601.

In one embodiment, the budget assigned to a block is a function of the block's position within the image 601. In one such embodiment, the position of a block is defined by the distance between that block and the position 615. Thus, for example, different budgets can be assigned to blocks within image portion (MCU) 610 and to blocks within image portion (MCU) 611 according to the distances from image portion 610 to position 615 and from image portion 611 to position 615, respectively. In the example of FIG. 6A, blocks within image portion 611 may be assigned a higher budget because image portion 611 is closer to position 615 than image portion 610.

The distance from image portion 611 to position 615, for example, is given by:

$$\text{distance} = \text{sqrt}[(x-x_c)^2 + (y-y_c)^2];$$

where $(x_c, y_c)$ are coordinates associated with position 615 and $(x, y)$ are coordinates associated with image portion 611, and where "sqrt" refers to the square-root. The budget for a block at $(x, y)$ can then be assigned using:

$$\text{budget} = a - b*\text{sqrt}[(x-x_c)^2 + (y-y_c)^2];$$

where "a" and "b" are programmable constants. The values of "a" and "b" can be selected so that a positive value is calculated for the budget.

To simplify the calculation of distance, a formula of the following form can instead be used:

$$\text{distance} = c*\text{abs}(x-x_c) + d*\text{abs}(y-y_c);$$

where "abs" refers to the absolute value, and where "c" and "d" are programmable constants. The budget for a block at $(x,y)$ can then be assigned using:

$$\text{budget} = e - c*\text{abs}(x-x_c) - d*\text{abs}(y-y_c);$$

where "e" is also a programmable constant, and where "c," "d" and "e" can be selected so that a positive value is calculated for the budget. The values of "c" and "d" may be chosen depending on the shape of image 601. For example, "c" and "d" may be the same for a square-shaped image but different for a rectangular-shaped image.

Different values of "a," "b," "c," "d" and "e" may be applied to the different image components. That is, for example, the values of "a," "b," "c," "d" and "e" for a Y-block may be different from the values of "a," "b," "c," "d" and "e" for a U-block or V-block. Other methods of calculating distance can be used. Also, the size of a budget assigned to a block can be determined using a basis other than the distance between the image portion associated with the block and the position 615.

Figure 6B:
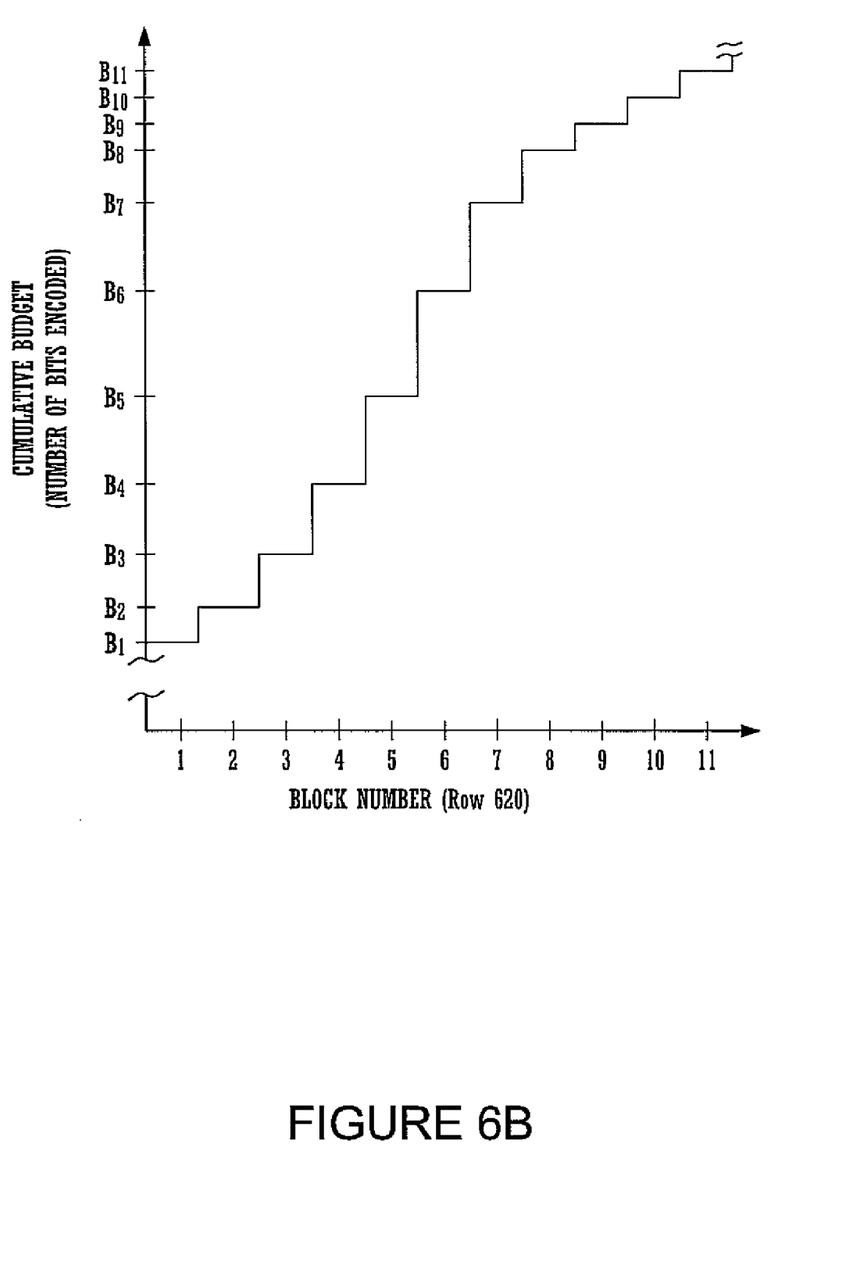
FIG. 6B is a graph of an example of a budget that can be used to achieve rate control according to one embodiment of the present invention.

FIG. 6B is a graph of an example of a budget that can be used to achieve rate control according to one embodiment of the present invention. The budget illustrated by FIG. 6B is an example of a cumulative budget (in which the budget is a cumulative value that accumulates from one block to the next). In the example of FIG. 6A, the budget assigned to a block in an image portion is a function of the distance between the image portion associated with the block and the position 615 of FIG. 6A.

The example budget of FIG. 6B corresponds to row 620 of FIG. 6A. Row 620 includes image portions (MCUs) 1 through 11; however, there may be any number of image portions in a row in an image. Because the budget is a cumulative budget, the budget limit associated with a block for image portion 1 of row 620 is, in general, equal to the cumulative budget at the end of the row that was encoded prior to row 620 plus a budget amount assigned to the block for image portion 1 (assuming that the image 601 is encoded row-by-row). The budget for each successive image portion in row 620 is increased by a respective amount, where that amount is a function of the distance between the image portion and position 615. Thus, as shown by FIG. 6B, the cumulative budget has a steeper slope as position 615 is approached, with the slope becoming less steep with increasing distance to position 615.

Figure 7:
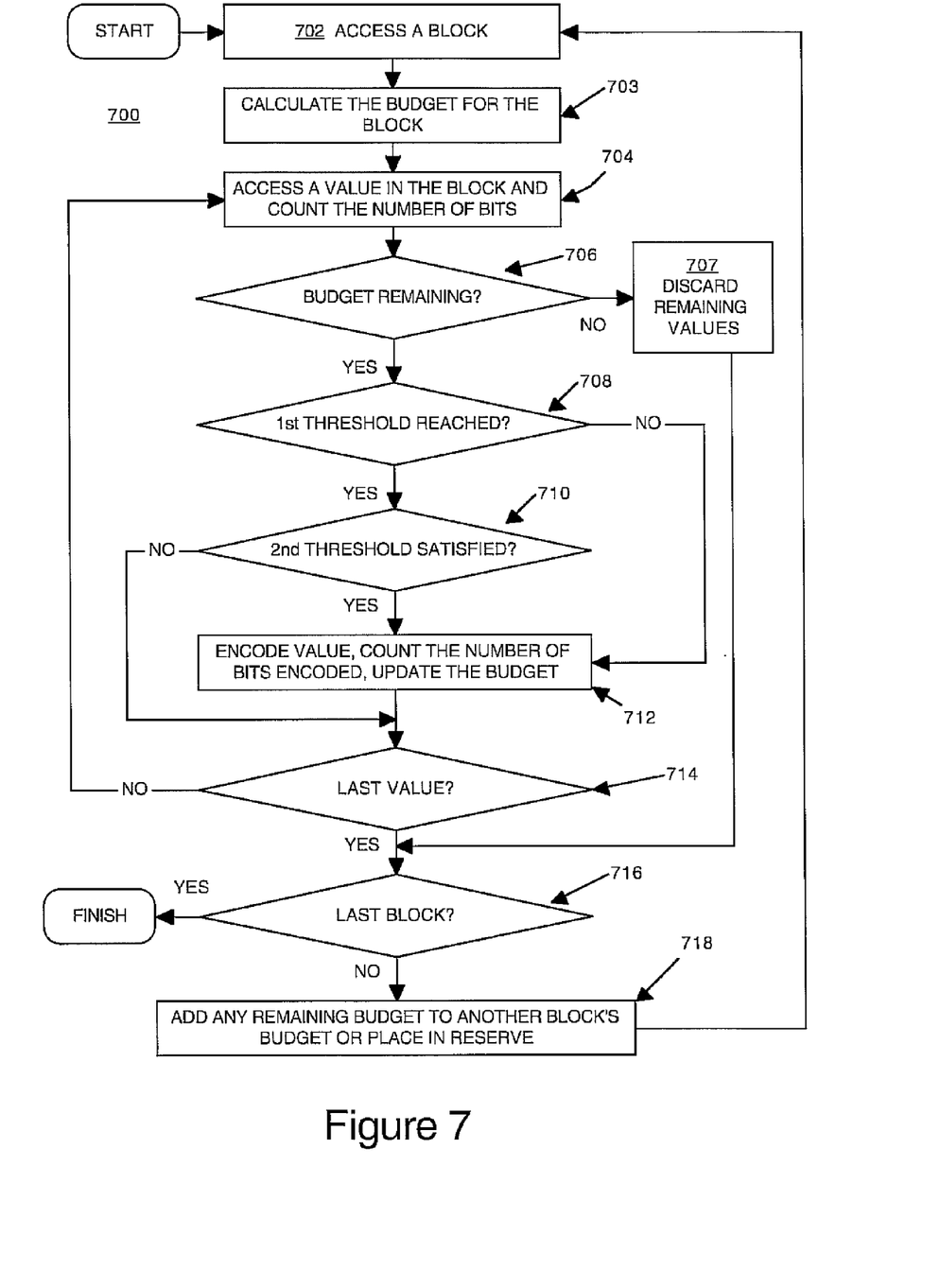
FIG. 7 is a flowchart of a method for compressing data according to one embodiment of the present invention.
Figure 8:
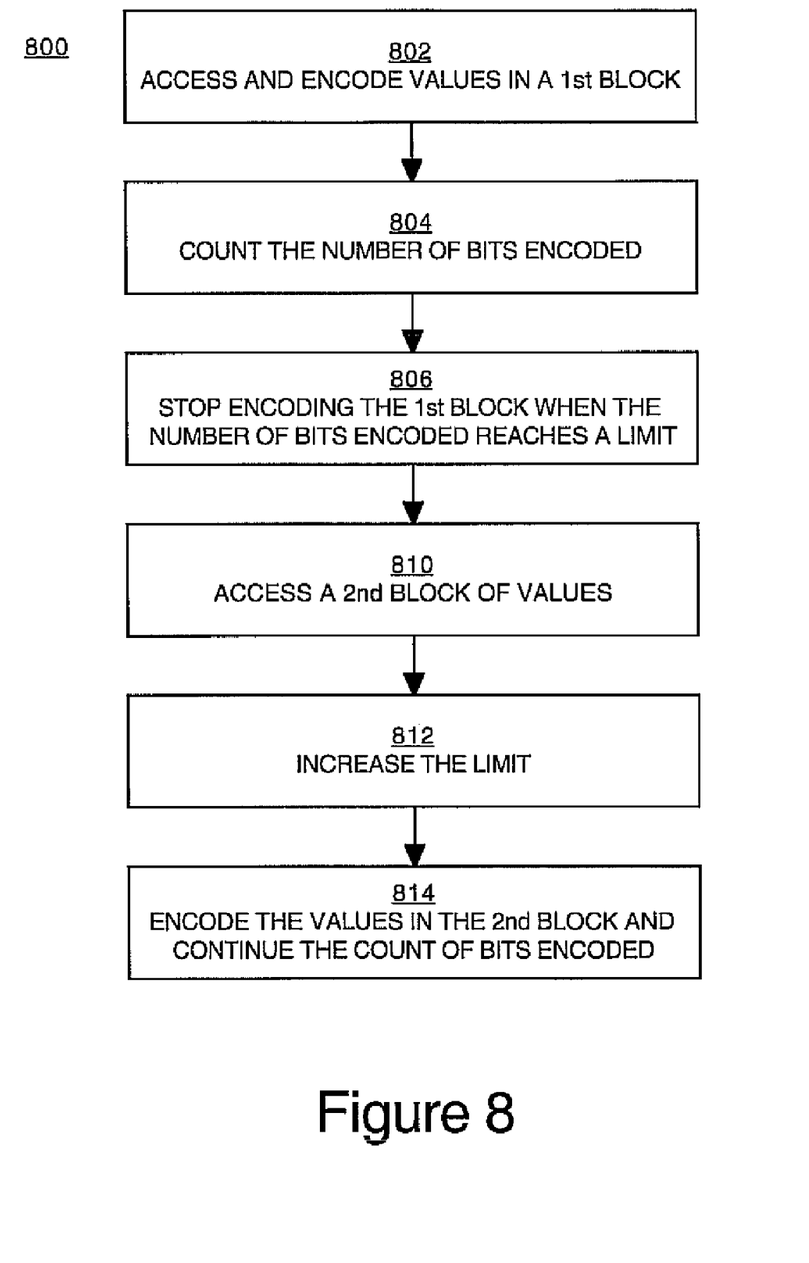
FIG. 8 is a flowchart of a method for compressing data according to another embodiment of the present invention.

FIG. 7 is a flowchart 700 of a computer-implemented method for compressing data according to one embodiment of the present invention. FIG. 8 is a flowchart 800 of a computer-implemented method for compressing data according to another embodiment of the present invention. Although specific steps are disclosed in flowcharts 700 and 800, such steps are exemplary. That is, the present invention is well suited to performing various other steps or variations of the steps recited in flowcharts 700 and 800. It is appreciated that the steps in flowcharts 700 and 800 may be performed in an order different than presented, and that the steps in flowcharts 700 and 800 are not necessarily performed in the sequence illustrated.

With reference first to FIG. 7, flowchart 700 begins at step 702. In step 702, a block of transformed and quantized values (e.g., block 432 of FIG. 4) is accessed.

In step 703 of FIG. 7, the budget of the block is calculated. The budget includes the budget amount assigned to the block, and can also include any remaining portion from the budget of another block previously encoded, as previously described herein.

In one embodiment, the values in the block are run-length encoded. In step 704, a value in the block is accessed and the number of bits associated with that value is counted.

In step 706, the count from step 704 is used to determine whether a budget assigned to the block is exceeded or not. If there is no budget remaining, or if the remaining budget is not sufficient for the value accessed in step 704 to be encoded, then flowchart 700 proceeds to step 707. Otherwise, flowchart 700 proceeds to step 708.

In step 707, in the present embodiment, the remaining values in the block (e.g., block 432 of FIG. 4) are not encoded. In effect, the remaining values are discarded by inserting an end-of-block code into the encoded data. Flowchart 700 then proceeds to step 716.

In step 708 of FIG. 7, in one embodiment, a determination is made as to whether a first threshold value within the budget has been reached or exceeded. As described above, the first threshold establishes a margin to the budget limit. If the first threshold has not been reached or exceeded, then flowchart 700 proceeds to step 712. Otherwise, flowchart 700 proceeds to step 710.

In step 710, a determination is made as to whether a second threshold value is satisfied. As described above, the second threshold value corresponds to the size (e.g., magnitude or number of bits) associated with the value accessed in step 704. If the value accessed in step 704 does not satisfy the second threshold, then flowchart 700 returns proceeds to step 714. Otherwise, flowchart 700 proceeds to step 712.

In step 712, the value accessed in step 704 (the "value at hand") is encoded and the number of bits encoded is counted. The count includes the number of bits associated with the value at hand as well as the number of bits associated with any other values in the block that were encoded prior to the value at hand. The count is used in block 706 above to determine whether sufficient budget remains to encode the next value in the block.

In step 714, a determination is made as to whether the value at hand is the last value in the block. If not, then flowchart 700 returns to step 704, where the encoding process is started for a new value in the block. Otherwise, flowchart 700 proceeds to step 716.

In step 716, a determination is made as to whether the block is the last block to be encoded. If so, then flowchart 700 is ended. Otherwise, flowchart 700 proceeds to step 718.

In step 718, if there is any budget remaining after the block is encoded, the residual portion of the budget can be added to the budget assigned to another block of transformed and quantized data values, perhaps the next block to be encoded. Alternatively, the residual portion of the budget can be placed into a reserve and used later as needed. Encoding of the block at hand is thus ended, and flowchart 700 returns to step 702 for encoding of the next block.

Referring now to FIG. 8, in step 802, a first plurality of transformed and quantized values associated with a first block (e.g., block 432 of FIG. 4) of image data is accessed. The first block is associated with a first position within the image.

In step 804 of FIG. 8, the number of bits encoded during run-length encoding of the first block is counted.

In step 806, encoding of the first block continues until a budget limit that is applied to the first block is reached. That is, run-length encoding of the first block is concluded should the count reach a budget limit that is applied to the first block; if the budget limit is not reached, then the first block of data may be encoded in its entirety.

In step 810, once encoding of the first block is concluded, a second plurality of transformed and quantized values associated with a second block of image data is accessed. The second block is associated with a second position within the image.

In step 812, the budget limit mentioned in step 806 is increased to establish a new limit to account for encoding of the second block. Note that the new limit will include any portion of the budget not consumed during encoding of the first block.

In step 814, the count that was started in step 804 is continued during run-length encoding of the second block. Run-length encoding of the second block is ended should the count reach the new limit, and otherwise may continue until the second block of data is encoded in entirety. Flowchart 800 continues in this manner for each block of data that is to be encoded.

It is appreciated that the method described by flowchart 800 can be extended to include other features of the present invention that are described above. For example, as the transformed and quantized values in a block) are encoded and the number of encoded bits are counted, a first threshold (within the budget limit being applied to the block) and a second threshold (corresponding to the size of the values being encoded) can be applied, as described above.

In summary, embodiments of the present invention provide methods and systems for efficiently compressing image data into a target file or bitstream size, without unnecessary iterations and without significantly reducing image fidelity. In one embodiment, the transformed and quantized values in a block that are encoded later in the process of run-length encoding, and that generally correspond to the values that contribute less to image fidelity, are discarded (not encoded), reducing the amount of compressed data without significantly reducing image fidelity. In another embodiment, the "smaller" transformed and quantized values (e.g., those values that do not satisfy the second threshold mentioned above), which generally do not contribute significantly to image fidelity, are discarded (not encoded), also reducing the amount of compressed data while maintaining image fidelity.

Embodiments in accordance with the present invention can be implemented in hardware or software or a combination thereof. For example, certain types of information used during the encoding of an image can be stored, and that information subsequently used during a subsequent encoding of the image in order to improve the efficiency of the subsequent encoding by reducing the number of iterations that may be needed.

Although described for JPEG encoding, the present invention is not so limited. For example, embodiments in accordance with the present invention can also be applied in MPEG (Motion Pictures Expert Group) encoding.

Embodiments of the present invention are thus described. While the present invention has been described in particular embodiments, it should be appreciated that the present invention should not be construed as limited by such embodiments, but rather construed according to the below claims.

What is claimed is:

1. A computer-implemented method of compressing an image, said method comprising:

a computer system accessing a first plurality of transformed and quantized values associated with a first block of image data, wherein said first block corresponds to a first position within said image, each of said values represented as a number of bits;

said computer system maintaining a count of the number of bits encoded during run-length encoding of said first block, wherein said run-length encoding of said first block is concluded provided said count reaches a limit; and identifying a first threshold for said count, said first threshold establishing a margin to said limit, wherein transformed and quantized values that fail to satisfy a second threshold are not encoded provided said first threshold is reached.

2. The computer-implemented method of claim 1 wherein said limit has a value that is determined according to said first position.

3. The computer-implemented method of claim 1 further comprising increasing said limit to encode a second block of data corresponding to a second position within said image.

4. The computer-implemented method of claim 1 further comprising:
   accessing a second plurality of transformed and quantized values associated with a second block of image data, wherein said second block corresponds to a second position within said image;
   increasing said limit by an amount to establish a new limit to account for encoding of said second block; and
   increasing said count during run-length encoding of said second block, wherein said run-length encoding of said second block is ended provided said count reaches said new limit.

5. The computer-implemented method of claim 4 wherein said amount is determined according to said second position.

6. The computer-implemented method of claim 1 wherein said second threshold is applied to the size in number of bits of said transformed and quantized values, wherein transformed and quantized values that do not satisfy said second threshold are set to zero.

7. The computer-implemented method of claim 1 wherein said second threshold is changed during said run-length encoding.

8. The computer-implemented method of claim 1 wherein said first block corresponds to a first position in said image, wherein said first block is one block in a plurality of blocks of image data that corresponds to said first position, wherein the number of bits encoded during run-length encoding of each block in said plurality of blocks is subject to a respective limit.

9. The method of claim 1 further comprising:
   receiving a block of uncompressed image data;
   transforming said uncompressed image data using a discrete cosine transformation to generate transformed data; and
   quantizing said transformed data to generate said transformed and quantized data.

10. A computer-readable memory having computer-executable program code embodied therein for causing a computer system to perform a method of compressing image data comprising a first plurality of blocks of transformed and quantized data, said method comprising:
   assigning a first budget to a first block in said first plurality of blocks, wherein said first budget comprises a limit to the number of bits available for encoding said first block;
   encoding said first block, wherein said encoding of said first block continues provided a first budget assigned to said first block is not exceeded, wherein otherwise said encoding of said first block is discontinued; and
   identifying a first threshold within said first budget, wherein transformed and quantized values that fail to satisfy a second threshold are not selected during said run-length encoding should said first threshold be reached.

11. The computer-readable memory of claim 10 wherein said method further comprises adding a portion of said first budget that remains after said encoding of said first block to a second budget that is assigned to a second block in said first plurality of blocks.

12. The computer-readable memory of claim 10 wherein said first block comprises a plurality of transformed and quantized values, each of said transformed and quantized values represented by a respective number of bits, wherein said encoding further comprises:
   selecting a transformed and quantized value; and
   reducing said first budget by the number of bits associated with said transformed and quantized value.

13. The computer-readable memory of claim 10 wherein said second threshold corresponds to the size in number of bits of said transformed and quantized values, and wherein transformed and quantized values that do not satisfy said second threshold are set to zero.

14. The computer-readable memory of claim 10 wherein the sizes in number of bits of said transformed and quantized values are measured against said second threshold, and wherein transformed and quantized values that do not satisfy said second threshold are set to zero.

15. The computer-readable memory of claim 10 wherein said method further comprises changing said second threshold during said encoding.

16. The computer-readable memory of claim 10 wherein said first block corresponds to a position within an image, and wherein said first budget has a value that corresponds to said position.

17. The computer-readable memory of claim 10 wherein said first block corresponds to a position in an image, wherein said first block is one block in a second plurality of blocks that corresponds to said position, and wherein each block in said second plurality of blocks is subject to a respective budget during encoding.

18. A system comprising:
   a memory; and
   a processor, said system for executing a method of compressing an image, said method comprising:
      accessing a first plurality of transformed and quantized values associated with a first block of image data, wherein said first block corresponds to a first position within said image, each of said values represented as a number of bits;
      maintaining a count of the number of bits encoded during run-length encoding of said first block, wherein said run-length encoding of said first block is concluded provided said count reaches a limit; and
      identifying a first threshold for said count, said first threshold establishing a margin to said limit, wherein transformed and quantized values that fail to satisfy a second threshold are not encoded provided said first threshold is reached.

19. The system of claim 18 wherein said limit has a value that is determined according to said first position.

20. The system of claim 18 wherein said limit is increased to encode a second block of data corresponding to a second position within said image.

21. The system of claim 18 wherein said method further comprises:
   accessing a second plurality of transformed and quantized values associated with a second block of image data, wherein said second block corresponds to a second position within said image;
   increasing said limit by an amount to establish a new limit to account for encoding of said second block; and
   increasing said count during run-length encoding of said second block, wherein said run-length encoding of said second block is ended provided said count reaches said new limit.

22. The system of claim 21 wherein said amount is determined according to said second position.

23. The system of claim 18 wherein said second threshold is applied to the size in number of bits of said transformed and quantized values, wherein transformed and quantized values that do not satisfy said second threshold are set to zero.

24. The system of claim 18 wherein said second threshold is changed during said run-length encoding.

25. The system of claim 20 wherein said first block corresponds to a first position in said image, wherein said first block is one block in a plurality of blocks of image data that corresponds to said first position, wherein the number of bits encoded during run-length encoding of each block in said plurality of blocks is subject to a respective limit.

* * * * *